United States Patent
Ito (10) Patent No.: US 8,085,646 B2
(45) Date of Patent: Dec. 27, 2011

(54) OPTICAL PICKUP LENS CAPABLE OF DETECTING THE TILT STATE

(75) Inventor: Mitsuru Ito, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 426 days.

(21) Appl. No.: 12/286,287

(22) Filed: Sep. 30, 2008

(65) Prior Publication Data

US 2009/0109830 A1    Apr. 30, 2009

(30) Foreign Application Priority Data

Oct. 25, 2007   (JP) ................................ 2007-277105

(51) Int. Cl.
*G11B 7/00* (2006.01)

(52) U.S. Cl. ................... 369/112.23; 369/121

(58) Field of Classification Search .......... None
See application file for complete search history.

(56) References Cited

U.S. PATENT DOCUMENTS

| | | | | |
|---|---|---|---|---|
| 4,532,522 A | * | 7/1985 | Tsunoda et al. | 369/44.38 |
| 5,883,709 A | * | 3/1999 | Okuda et al. | 356/138 |
| 5,995,304 A | * | 11/1999 | Nomura et al. | 359/726 |
| 2007/0201327 A1 | * | 8/2007 | Kabasawa | 369/44.32 |

FOREIGN PATENT DOCUMENTS

| | | |
|---|---|---|
| JP | 06-267103 | 9/1994 |
| JP | A-2003-222707 | 8/2003 |

OTHER PUBLICATIONS

Aug. 16, 2011 Japanese Office Action in Application No. 2007-277105 (with translation).

* cited by examiner

*Primary Examiner* — Paul Huber
(74) *Attorney, Agent, or Firm* — Oliff & Berridge, PLC (57) ABSTRACT

An optical pickup lens includes a first surface to focus laser light for recording/playback on an optical disc, a second surface formed outside the first surface and radiated with laser light for lens tilt detection, and an antireflection coating to transmit the laser light for recording/playback, the antireflection coating being continuously formed on the first surface and a second surface.

25 Claims, 3 Drawing Sheets

|  | LASER SPOT DIAMETER OUTLINE OF AUTOCOLLIMATOR | LASER BRIGHTNESS OF AUTOCOLLIMATOR |
| --- | --- | --- |
| EXAMPLE 1 | E | E |
| EXAMPLE 2 | G | E |
| EXAMPLE 3 | E | E |
| EXAMPLE 4 | E | E |
| EXAMPLE 5 | G | G |
| EXAMPLE 6 | G | G |
| COMPARATIVE EXAMPLE 1 | B | B |
| COMPARATIVE EXAMPLE 2 | B | B |
| COMPARATIVE EXAMPLE 3 | B | B |
| COMPARATIVE EXAMPLE 4 | B | B |
| COMPARATIVE EXAMPLE 5 | M | M |
| COMPARATIVE EXAMPLE 6 | M | M |

Fig. 6

250# OPTICAL PICKUP LENS CAPABLE OF DETECTING THE TILT STATE

BACKGROUND OF THE INVENTION

1. Field of the Invention

The present invention relates to an optical pickup lens which is used in an optical system that performs recording or playback of an optical disc and, particularly, to a technique of detecting the tilt state of an optical pickup lens.

2. Description of Related Art

Various optical discs such as a compact disc (CD), a digital versatile disc (DVD) and a Blu-ray disc (BD) are developed and manufactured as media to be used for an optical disc drive. An optical system that performs recording or playback of such optical discs includes an optical pickup lens. The optical pickup lens plays an important role in focusing laser light on an optical disc when recording or playing back data on an optical disc.

Optical discs are produced so as to show a jitter value that is best suited to respective standards. However, optical discs cannot sufficiently exert their capabilities unless an optical pickup lens accurately focuses laser light on each optical disc and forms a suitable optical spot. Although an optical pickup lens can form a suitable optical spot by satisfying properties such as a shape, a refractive index and an aberration, even if an optical pickup lens that satisfies such properties can be manufactured, a suitable optical spot cannot be formed unless the optical pickup lens is accurately mounted to an optical pickup in an optical disc drive.

Generally, it is required to let the optical axes of laser light emitted from a laser and an optical pickup lens coincide with each other, and further to let the center of the opening in a lens holder of an optical pickup and the lens center of the optical pickup lens coincide with each other. The opening of the lens holder of the optical pickup is perpendicular to the optical axis of laser light. The opening surface of the lens holder is parallel to the mounting surface of the optical pickup lens.

One method of letting the opening center of the lens holder and the lens center of the optical pickup lens coincide with each other is to form an outer frame on the lens mounting surface in such a way that the outer flange of the optical pickup lens is fit into it, and adjust a difference in size between the outer frame and the optical pickup lens, which is "play". According to this method, once the outer frame is determined, there is no possibility that any problem occurs when mounting the optical pickup lens to the pickup. Needless to say, in order to produce the outer frame into which the outer flange of the optical pickup lens is fit into on the lens mounting surface, it is necessary that the center of the outer diameter of the optical pickup lens and the center of the effective diameter of the optical pickup lens coincide with each other. This is the condition required to be satisfied when manufacturing the optical pickup lens.

A general method of letting the optical axes of laser light and an optical pickup lens coincide with each other is to apply laser light for lens tilt adjustment onto a flange surface outside the disc-side effective diameter of the optical pickup lens, measure the angle of reflected light of the laser light for lens tilt adjustment, adjust the tilt of the optical pickup lens and, fix the optical pickup lens by an adhesive or the like in the process of mounting the optical pickup lens. In some cases, it may be necessary to set the angle between the optical axis of the optical pickup lens and the optical axis of laser light to a fixed angle, rather than let them coincide with each other, in terms of manufacture or adjustment of the performance of the pickup. In such a case as well, it is common to employ the above-described method of using the laser light for lens tilt adjustment.

Preferable conditions for increasing the working efficiency in optical pickup lens tilt adjustment are that the amount of laser light for lens tilt adjustment reflected on the flange surface of the optical pickup lens, which is reflected light, is large, that the reflected light is sharp or well-defined, and that the optical spot of laser light for lens tilt adjustment focused on the flange surface has a suitable shape (e.g. non-distorted, perfect circle). An example of a method of achieving such conditions is to form a mirror-finished surface outside the effective diameter of the optical pickup lens and reflect the laser light for lens tilt adjustment on the mirror-finished surface. This method increases the amount of reflected light of the laser light for lens tilt adjustment and forms the optical spot of the laser light on the mirror-finished surface into a suitable shape.

In addition to the process of lens tilt adjustment, there is the process of applying laser light onto the area from the outside of the lens effective diameter to the lens outer diameter of the optical pickup lens and monitoring the state of a lens tilt. This is the process of adjusting the operating direction of the optical pickup to which the optical pickup lens is fixed, for example. In such a process as well, it is preferable to increase the amount of reflected light of laser light and to form a non-distorted circular optical spot on the position where the laser light is applied, just like the process of lens tilt adjustment.

An optical pickup lens for recording or playback of DVD discs and CD discs is generally made of a plastic material. Because the plastic material can be molded into any shape, it is possible to flexibly form the shape of the area from the outside of the lens effective diameter to the lens outer diameter of the optical pickup lens. It is thereby possible to form the areas from the outside of the lens effective diameter to the lens outer diameter on the laser side and the disc side of the optical pickup lens into different shapes from each other. Further, the lens effective diameter portion and the outside portion are often formed by different molds. Thus, by adjusting the relative positional relationship in the optical axis direction between a mold for the lens effective diameter portion and a mold for the outside portion to be fixed to the optical pickup, it is possible to adjust the distance between the laser of the optical pickup and the optical pickup lens to a certain degree. It is also possible to eliminate an unnecessary structure on the disc surface side.

In the optical pickup lens that is made of plastic and formed by molding, it is common to form a mirror-finished surface in a given position within the area from the lens effective diameter to the lens outer diameter on the disc surface side of the optical pickup lens.

On the other hand, an optical pickup lens for recording or playback of BD discs and HD-DVD discs is generally made of a glass material. In the case of using glass, the flexibility in the shape of the area from the lens effective diameter to the lens outer diameter is low. This is because if a complex shape is formed using glass, a difference is generated within the shape due to thermal shrinkage that occurs after press molding until the material is cooled to normal temperature, making it subject to breakage. For this reason, in the case of using a glass material, it is common to form the area from the lens effective diameter to the lens outer diameter into a flat shape. Further, in order to avoid a failure to accurately form the shape of the area of the lens effective diameter in the structure where the outer flange portion of the lens effective diameter is directly coupled to the flat area, the outer flange portion of the lens effective diameter may be coupled to the flat area via a curved portion in cross section.

In the optical pickup lens that is made of glass, the flat portions that are formed in the areas from the lens effective diameter to the lens outer diameter on the laser light source side and the disc side should be perpendicular to the lens optical axis in each of the laser light source side and the disc side; therefore, they are formed to be parallel to each other in most cases.

Japanese Unexamined Patent Application Publication No. 2003-222707 discloses an optical pickup lens whose surface is coated with an antireflection coating in order to enhance the light use efficiency. However, Japanese Unexamined Patent Application Publication No. 2003-222707 discloses nothing about the technique of applying laser light for tilt adjustment or the like.

In order to accurately mount an optical pickup lens onto an optical pickup and correctly detect the mounted state, there is a case of applying laser light from the disc side to the flange surface on the same side and reflecting the laser light not on the above flange surface but on the opposite surface (i.e. the surface on the side of laser for recording or playback). In such a case, however, the light that is reflected on the opposite surface serves as stray light that interferes with detection based on proper light.

SUMMARY OF THE INVENTION

The present invention has been accomplished to address the above concern, and an object of the present invention is thus to provide an optical pickup lens capable of accurately detecting the tilt state of the optical pickup lens with respect to an optical pickup.

According to an embodiment of the present invention, there is provided an optical pickup lens includes a first surface to focus laser light for recording/playback on an optical disc, a second surface formed outside the first surface and radiated with laser light for lens tilt detection, and an antireflection coating to transmit the laser light for recording/playback, the antireflection coating being continuously formed on the first surface and a second surface.

In a preferred embodiment, the second surface is a flange surface substantially perpendicular to a lens axis of the optical pickup lens.

Preferably, the second surface is a surface facing toward a laser light source device to emit the laser light for lens tilt detection.

Further preferably, a wavelength $\lambda 2$ of the laser light for lens tilt detection is different from a wavelength $\lambda 1$ of the laser light for recording/playback.

Particularly, it is preferred that the wavelength $\lambda 1$ (nm) and the wavelength $\lambda 2$ (nm) satisfy $\lambda 2 - \lambda 1 \geq 20$ nm.

Further, it is preferred that the second surface is mirror finished.

It is also preferred that the antireflection coating covers at least 70% of an area of the flange surface.

When a radius of a surface that uniformly reflects the laser light for lens tilt detection is R and a radius of an outermost periphery of the antireflection coating is R+R1, it is preferred to satisfy an expression of $R/(R+R1)*100<98$.

It is further preferred that an antireflection coating is formed on a lens surface facing toward a laser light source device to emit the laser light for recording/playback and a surface outside the lens surface.

In the above structure, the antireflection coating formed on the lens surface facing toward the laser light source device to emit the laser light for recording/playback and the surface outside the lens surface preferably has a higher transmittance to the laser light for lens tilt detection than the antireflection coating formed on a lens surface facing toward the optical disc and a surface outside the lens surface.

According to another embodiment of the present invention, there is provided an optical pickup device that includes the optical pickup lens described above, a laser light source device to emit laser light for lens tilt detection, and a unit to detect the amount of a lens tilt by detecting the laser light emitted from the laser light source device and reflected on a part of the optical pickup lens.

According to another embodiment of the present invention, there is provided an optical pickup lens includes a lens body having light input and output surfaces being opposed to each other, the light output surface including a lens surface and a flange surface that is provided outer than the lens surface from an optical axis of the optical pickup lens; and a first coating layer extending continuously towards the optical axis and being provided on a boundary between the flange surface and the lens surface, the first coating layer being substantially transparent to first laser light for recording/playback and being substantially reflective to second laser light for lens tilt detection.

It is preferred that a wavelength $\lambda 1$ (nm) of the first laser light is different from a wavelength $\lambda 2$ (nm) of the second laser light, and the wavelength $\lambda 1$ (nm) and the wavelength $\lambda 2$ (nm) satisfy a following expression: $\lambda 2 - \lambda 1 \geq 20$ nm.

It is further preferred that the flange surface is mirror finished.

It is further preferred that the first coating layer covers at least 70% of an area of the flange surface.

It is further preferred that a second coating layer is formed on the light input surface.

It is further preferred that the second coating layer has a higher transmittance to the second laser light than the first coating layer.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

An optical pickup lens according to an embodiment of the present invention is described hereinafter with reference to the explanatory view shown in FIG. 1. An optical pickup lens 1 according to this embodiment is an optical element that focuses laser light with a wavelength of 400 nm to 412 nm onto an information recording surface of a BD disc.

In the optical pickup lens 1, an incident surface on which laser light for recording or playback is incident is referred to as a laser surface 1a, and an exit surface through which the laser light exits is referred to as a disc surface 1b. A circular structure from the outside of a surface that contributes to focusing or diverging light to the periphery of the optical pickup lens 1 is referred to as a flange, and the lens is generally mounted to a holder or the like at this portion. Referring to FIG. 1, a surface that is substantially perpendicular to the lens optical axis in a shape 11 from the outside of the lens effective diameter to the lens outer diameter on the laser surface 1a is referred to as a laser-side flange surface 11a. Likewise, a surface that is substantially perpendicular to the lens optical axis in a shape 12 from the outside of the lens effective diameter to the lens outer diameter on the disc surface 1b is referred to as a disc-side flange surface 12a. In this description, an "flange surface" is used as a generic term that includes both of the laser-side flange surface 11a and the disc-side flange surface 12a.

As a material of the optical pickup lens 1, plastic such as olefin resin and acrylic resin, thermosetting silicone resin, optical glass and so on may be used. Further, antioxidant, hindered amine light stabilizer, or inorganic substance for improving temperature characteristics may be dispersed in plastic. A material of the optical pickup lens 1 should transmit a wavelength of 400 nm to 412 nm, which is the wavelength of laser light used for recording or playback.

In the case of using plastic as a material of the optical pickup lens 1, the optical pickup lens 1 is generally formed by injection molding. In the case of using thermosetting silicone resin, the optical pickup lens 1 is formed by pouring the resin into a mold and curing it. In the case of using optical glass, the optical pickup lens 1 is formed by pressing the optical glass and, in some cases, grinding a lens surface.

In the optical pickup lens 1, the laser-side flange surface 11a and the disc-side flange surface 12a respectively have flat planes, and the angle between the flat planes is 0.03 degrees or smaller in a preferred embodiment. If the surfaces on the laser side and the disc side of the optical pickup lens 1 are integrally formed, the flat planes indicate the angle of the lens surfaces, and reducing the angle improves the aberration characteristics of the lens. The laser-side flange surface 11a may be a mounting surface to a holder.

In this embodiment, an antireflection coating 13 is formed on the laser surface 1a. The antireflection coating 13 transmits a prescribed wavelength including the wavelength of laser light for recording or playback while it prevents transmission of and reflects a wavelength of light different from the prescribed wavelength. Although the antireflection coating 13 is formed to cover the lens effective diameter area of the laser surface 1a and not to cover the laser-side flange surface 11a in this example, the antireflection coating 13 may be formed to cover a part or the whole of the laser-side flange surface 11a. In such a case, the antireflection coating 13 is continuously deposited so as to extend to the lens mounting surface outside the a spherical portion of the optical pickup lens 1.

Further, an antireflection coating 14 is formed on the disc surface 1b. The antireflection coating 14 is formed to cover the disc-side flange surface 12a continuously to the lens effective diameter area of the disc surface 1b. Although the antireflection coating 14 in the example shown in FIG. 1 is formed to cover substantially the whole of the disc-side flange surface 12a, it may be formed to cover at least 70% of the area. The antireflection coating 14 preferably has a circular shape centering on the lens center, though not limited thereto.

Although the antireflection coating 14 should at least cover a part of the disc-side flange surface 12a that uniformly reflects laser light 16 for lens tilt detection, it is preferred that the antireflection coating 14 is deposited to be larger than such a part. The periphery of the deposition range of the antireflection coating 14 is often different from the center of the deposition range in thickness distribution and grain diameter, and therefore the reflection properties are often different between the periphery and the center. Forming the antireflection coating 14 to be larger than the reflection surface prevents the laser light 16 for lens tilt detection from being applied to an area having a different reflection properties from the center, thereby increasing the uniformity of reflected light. Specifically, manufacture is facilitated by satisfying the following expression, where the radius (the radius from the lens center) of the surface that uniformly reflects the laser light 16 for lens tilt detection is R and the radius of the outermost periphery of the antireflection coating is R+R1:

$$R/(R+R1)*100<98$$

Whether it is the surface that uniformly reflects the laser light 16 for lens tilt detection can be determined by measuring a reflectance. For example, the area inside the boundary at which a reflectance changes by 5% or more (in this case, a reflectance is higher by 5% or more in the inside area than in the outside area) in the state where the antireflection coating 14 is not deposited may be determined to be the surface that uniformly reflects the laser light 16 for lens tilt detection.

The disc-side flange surface 12a is preferably a mirror-finished surface. This enhances the smoothness of the surface to be covered with the antireflection coating 14, which enables accurate detection of the amount of a lens tilt.

The antireflection coatings 13 and 14 are films that optimize a transmittance at 400 nm to 412 nm, which is the wavelength of laser light for recording or playback of a BD disc, and that reflect laser for lens tilt adjustment having a wavelength different from the above wavelength. Thus, the antireflection coatings 13 and 14 transmit a wavelength of 400 nm to 412 nm and reflect a different wavelength (e.g. a wavelength of 680 nm). As a material of the antireflection coatings 13 and 14, cerium oxide, tantalum oxide, titanium oxide, silicon oxide, chromium oxide, magnesium fluoride or the like may be used. The antireflection coatings 13 and 14 may be deposited by a method such as sputtering, vapor deposition, or chemical vapor deposition (CVD).

A laser light source device 15 emits laser light 16 for lens tilt detection that is used not only for adjusting a lens tilt but also for monitoring the amount of a lent tilt when checking the operation of a pickup including an actuator. The laser light 16 for lens tilt detection has a wavelength different from a wavelength of 400 nm to 412 nm, which is the wavelength of the laser light to be used for recording or playback of a BD disc. It is preferred to satisfy the following expression so as to obtain appropriate reflected light at λ2, where the wavelength of laser light for recording or playback is λ1 and the wavelength of the laser light 16 for lens tilt detection is λ2:

$$\lambda 2 - \lambda 1 \geq 20 \text{ nm}$$

Specifically, it is efficient that the wavelength of the laser light for recording or playback and the wavelength of the laser light 16 for lens tilt detection are distant from each other. For example, the wavelength of the laser light 16 for lens tilt detection may be 680 nm.

As the laser light source device 15, an autocollimator may be used, though another kind of a laser light source may be used instead.

An optical pickup that includes the optical pickup lens 1 further includes a lens tilt adjustment mechanism, a laser light source device that emits laser light for recording or playback of a BD disc, a collimator lens, a polarizing beam splitter, a photodetector and so on.

A tilt adjustment method of the optical pickup lens 1 is described hereinafter. First, the optical pickup lens 1 is temporarily mounted to a given holder. Next, the laser light 16 for lens tilt adjustment (e.g. laser light with a wavelength of 680 nm) that is emitted from the laser light source device 15 is applied to the disc-side flange surface 12*a* of the optical pickup lens 1.

Because the antireflection coating 14 that reflects the laser light for lens tilt adjustment is formed on the disc-side flange surface 12*a* of the optical pickup lens 1 as described earlier, the laser light 16 for lens tilt adjustment is reflected on the disc-side flange surface 12*a* and output as reflected light. The angle of the reflected light is detected using a detection mechanism (not shown), thereby performing tilt adjustment. Specifically, the tilt angle of the optical pickup lens 1 is adjusted so that the angle of the reflected light is included in a predetermined angle range, and the optical pickup lens 1 is fixed in the state where the angle of the reflected light is included in the predetermined angle range.

In the case of monitoring the lens tilt, laser light as lens tilt monitoring laser is applied to the disc-side flange surface 12*a* of the optical pickup lens 1, and its reflected light is detected, thereby obtaining a monitoring signal corresponding to a change in lens tilt.

In this manner, because the antireflection coating 14 is coated on the disc-side flange surface 12*a* of the optical pickup lens 1 according to this embodiment, it is possible to make sure to reflect the laser light that is applied for adjusting a lens tilt or monitoring a change in lens tilt on the disc-side flange surface 12*a*, increase the intensity and sharpness of the reflected light and form a non-distorted circular shape on the position where the laser light is applied, thereby detecting the amount of a lens tilt more accurately. Particularly, because the antireflection coating 14 is formed to extend to the disc-side flange surface 12*a*, it is possible to facilitate manufacture compared with the case of forming another reflection structure which is different form the antireflection coating 14.

In the case where the antireflection coating 13 and the antireflection coating 14 are respectively formed on the laser-side flange surface 11*a* and the disc-side flange surface 12*a*, it is preferred that the antireflection coating 13 formed on the laser-side flange surface 11*a* has a higher transmittance to the laser light 16 for lens tilt detection than the antireflection coating 14 formed on the disc-side flange surface 12*a*. Although the laser light 16 for lens tilt detection is basically reflected on the antireflection coating 14 formed on the disc-side flange surface 12*a*, if the antireflection coating 14 is too thin, the laser light can be transmitted through the antireflection coating 14. In such a case, there is a possibility that the laser light may be reflected on the antireflection coating 13 that is formed on the laser-side flange surface 11*a* of the optical pickup lens 1. If this occurs, the reflected light on the laser-side flange surface 11*a* interferes with detection of a lens tilt, which causes false detection of the amount of a lens tilt. In light of this, in order to prevent the laser light that is transmitted through the antireflection coating 14 formed on the disc-side flange surface 12*a* from being reflected on the antireflection coating 13 formed on the laser-side flange surface 11*a*, the antireflection coating 13 formed on the laser-side flange surface 11*a* has a higher transmittance to the laser light 16 for lens tilt detection than the antireflection coating 14 formed on the disc-side flange surface 12*a* as described above.

It is feasible to form the antireflection coating 13 on the laser-side flange surface 11*a* without forming the antireflection coating 14 on the disc-side flange surface 12*a*. This structure offers an advantage of accurately detecting the amount of a tilt on the lens mounting surface in the case of using the laser-side flange surface 11*a* as the lens mounting surface.

In the above-described embodiment, the antireflection coating that covers the lens surface or the lens effective diameter area and the antireflection coating that covers the flange surface outside the lens surface are the same continuous film. The present invention, however, is not limited thereto as long as the antireflection coating that covers the lens surface and the antireflection coating that covers the flange surface are the same at least partly. For example, if the antireflection coating that covers the lens surface has a three-layer structure in which a refractive index varies in the order of small, large and small from the lens surface side, the antireflection coating that covers the flange surface may have a two-layer structure in which one layer on the lens surface side is excluded from the three layers. Although it is necessary that the wavelength of the laser light for recording or playback and the wavelength of the laser light 16 for lens tilt detection are different form each other in the above-described embodiment, changing the layer structure in this manner allows reflection of the laser light 16 for lens tilt detection on the flange surface even if they are the same wavelength. The structure of the antireflection coating is not limited to have odd-number layers, and it may be composed of even-number layers depending on the relationship with the refractive index of the lens.

Examples of the optical pickup lens according to the present invention are described hereinafter. The present invention, however, is not limited thereto.

Example 1

Figure 1:
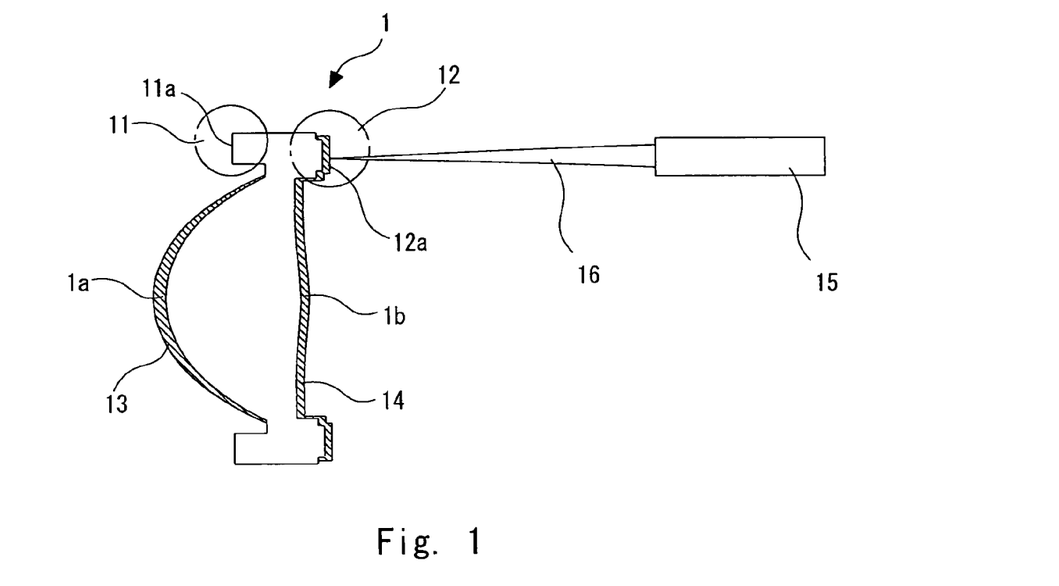
FIG. 1 is an explanatory view illustrating detection of a lens tilt of an optical pickup lens according to an embodiment of the present invention.

A lens having the structure shown in FIG. 1 was manufactured using polyolefin resin as a material of the optical pickup lens 1. The lens outer diameter is $\phi 4.5$ mm. In the optical pickup lens 1, the shape from the outside of the lens effective diameter to the lens outer diameter is different between a laser surface side 11 and a disc surface side 12. The position of the innermost periphery of the disc-side flange surface 12*a* of the disc surface portion 12 is $\phi 3.5$ mm, and the position of the outermost periphery of the same is $\phi 4.3$ mm. The disc-side flange surface 12*a* is mirror finished and entirely covered with the antireflection coating 14 in which a transmittance is highest at a wavelength of 405 nm. The outer diameter of the area covered with the antireflection coating 14 is $\phi 4.4$ mm. The laser surface side of the optical pickup lens 1 is covered with the antireflection coating 13 in which a transmittance is highest at a wavelength of 405 nm up to the position of $\phi 3.5$ mm. The laser light 16 with a wavelength of 680 nm emitted from the autocollimator 15 was applied and focused on the disc-side flange surface 12*a* of the optical pickup lens 1.

Example 2

Figure 2:
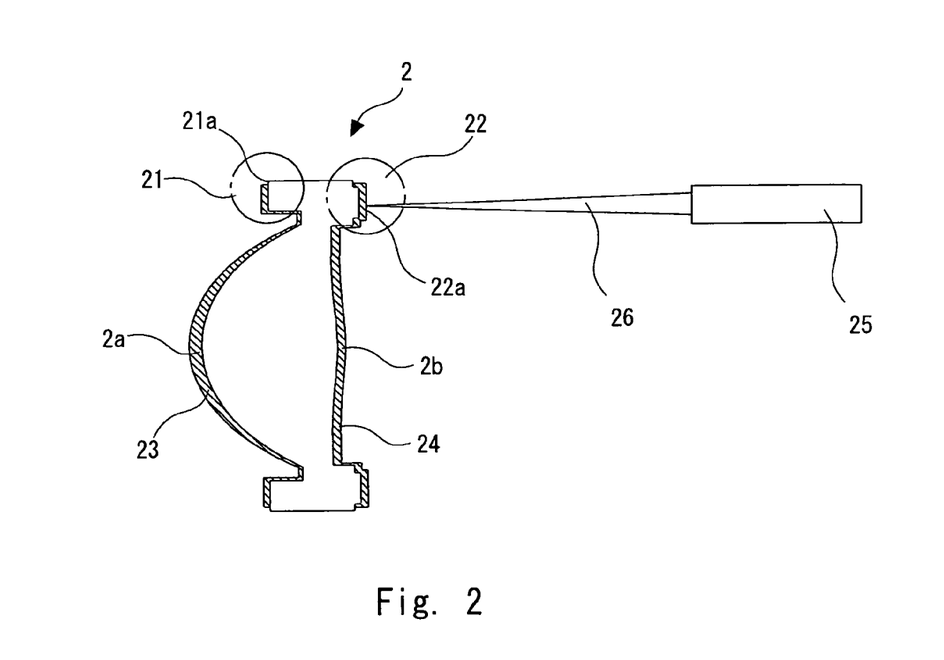
FIG. 2 is an explanatory view illustrating detection of a lens tilt of an optical pickup lens according to an embodiment of the present invention.

A lens having the structure shown in FIG. 2 was manufactured using polyolefin resin as a material of an optical pickup lens 2. The lens outer diameter is $\phi 4.5$ mm. In the optical pickup lens 2, the shape from the outside of the lens effective diameter to the lens outer diameter is different between a laser surface side 21 and a disc surface side 22. A disc-side flange surface 22a is formed on a disc surface, and the position of the innermost periphery of the disc-side flange surface 22a is φ3.5 mm, and the position of the outermost periphery of the same is φ4.3 mm. The disc-side flange surface 22a is mirror finished and entirely covered with an antireflection coating 24 in which a transmittance is highest at a wavelength of 405 nm. The outer diameter of the area covered with the antireflection coating 24 is φ4.4 mm. The laser surface side of the optical pickup lens 2 is covered with an antireflection coating 23 in which a transmittance is highest at a wavelength of 405 nm up to the position of φ4.4 mm. Laser light 26 with a wavelength of 680 nm emitted from an autocollimator 25 was applied and focused on the disc-side flange surface 22a of the optical pickup lens 2.

Example 3

Figure 3:
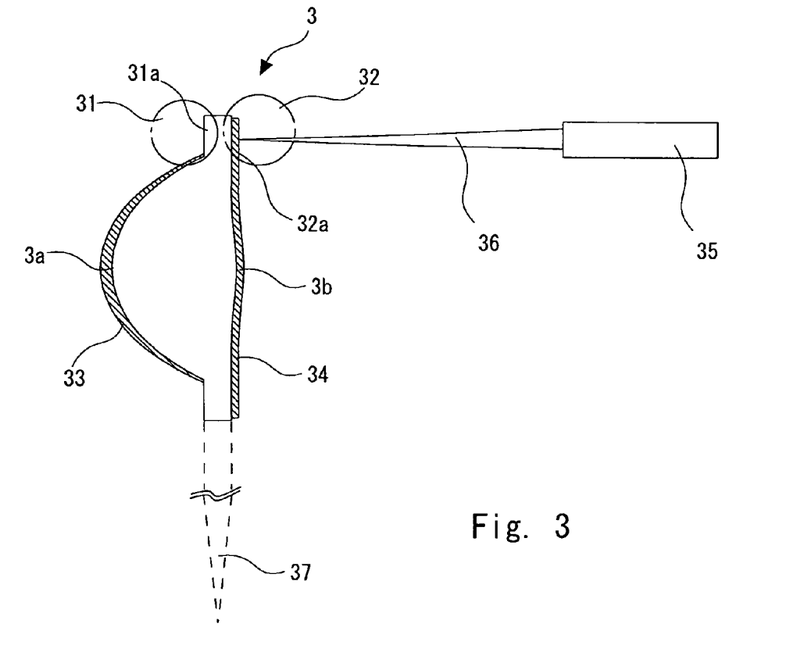
FIG. 3 is an explanatory view illustrating detection of a lens tilt of an optical pickup lens according to an embodiment of the present invention.

A lens having the structure shown in FIG. 3 was manufactured using optical glass as a material of an optical pickup lens 3. The lens outer diameter is φ4.5 mm. In the optical pickup lens 3, the shape from the outside of the lens effective diameter, which is φ3.3 mm, to the lens outer diameter is flat in both of a laser surface side 31 and a disc surface side 32. A tilt 37 of the both surfaces is 0.03 degree. A disc-side flange surface 32a is formed on a disc surface side portion 31, and the position of the innermost periphery of the disc-side flange surface 32a is φ3.5 mm, and the position of the outermost periphery of the same is φ4.3 mm. The disc-side flange surface 32a is mirror finished and entirely covered with an antireflection coating 34 in which a transmittance is highest at a wavelength of 405 nm. The outer diameter of the area covered with the antireflection coating 34 is φ4.4 mm. The laser surface side of the optical pickup lens 3 is covered with an antireflection coating 33 in which a transmittance is highest at a wavelength of 405 nm up to the position of φ3.5 mm. Laser light 36 with a wavelength of 680 nm emitted from an autocollimator 35 was applied and focused on the disc-side flange surface 32a of the optical pickup lens 3.

Example 4

Figure 4:
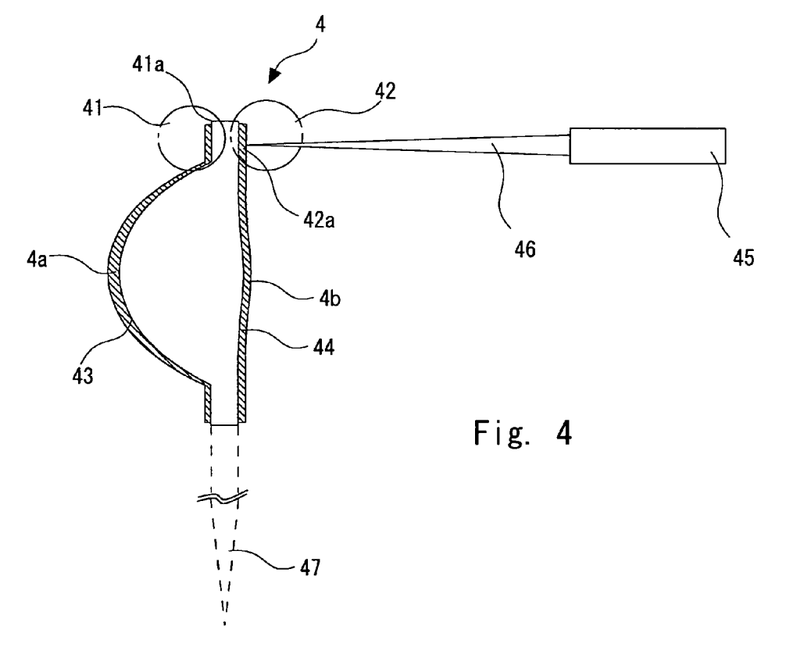
FIG. 4 is an explanatory view illustrating detection of a lens tilt of an optical pickup lens according to an embodiment of the present invention.

A lens having the structure shown in FIG. 4 was manufactured using optical glass as a material of an optical pickup lens 4. The lens outer diameter is φ4.5 mm. In the optical pickup lens 4, the shape from the outside of the lens effective diameter, which is φ3.3 mm, to the lens outer diameter is flat in both of a laser surface side 41 and a disc surface side 42. A tilt 47 of the both surfaces is 0.02 degree. A disc-side flange surface 42a is formed on a disc surface, and the position of the innermost periphery of the disc-side flange surface 42a is φ3.5 mm, and the position of the outermost periphery of the same is φ4.3 mm. The disc-side flange surface 42a is mirror finished and entirely covered with an antireflection coating 44 in which a transmittance is highest at a wavelength of 405 nm. The outer diameter of the area covered with the antireflection coating 44 is φ4.4 mm. The laser surface side of the optical pickup lens 4 is covered with an antireflection coating 43 in which a transmittance is highest at a wavelength of 405 nm up to the position of φ4.4 mm. Laser light 46 with a wavelength of 680 nm emitted from an autocollimator 45 was applied and focused on the disc-side flange surface 42a of the optical pickup lens 4.

Example 5

The optical pickup lens of the example 5 has substantially the same structure as the optical pickup lens of the example 4, except that the laser surface side of the optical pickup lens is covered with the antireflection coating 43 up to the position of φ4.3 mm.

Example 6

Figure 5:
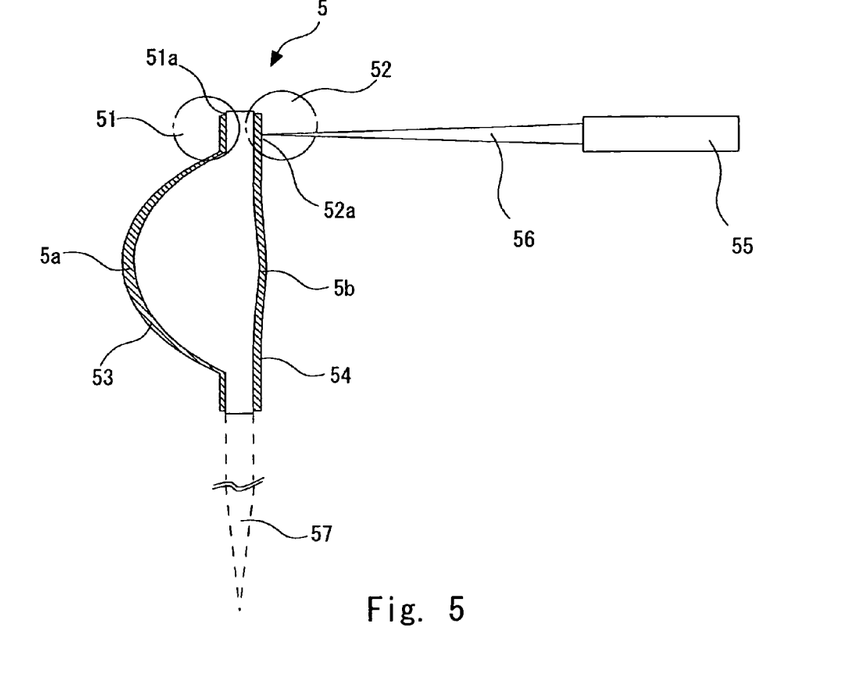
FIG. 5 is an explanatory view illustrating detection of a lens tilt of an optical pickup lens according to an embodiment of the present invention.

A lens having the structure shown in FIG. 5 was manufactured using optical glass as a material of an optical pickup lens 5. The lens outer diameter is φ4.5 mm. In the optical pickup lens 5, the shape from the outside of the lens effective diameter, which is φ3.3 mm, to the lens outer diameter is flat in both of a laser surface side 51 and a disc surface side 52. A tilt 57 of the both surfaces is 0.02 degree. Although a disc-side flange surface 52a is not mirror finished, a surface having smoothness is formed up to the position of 4.2 mm, and the surface is covered with an antireflection coating 54 up to the position of 4.3 mm. The laser surface side of the optical pickup lens 5 is covered with an antireflection coating 53 in which a transmittance is highest at a wavelength of 405 nm up to the position of φ4.4 mm. Laser light 56 with a wavelength of 680 nm emitted from an autocollimator 55 was applied and focused on the position of φ4.2 mm in the portion covered with the antireflection coating 54 from the outside of the effective diameter to the lens outer diameter of the optical pickup lens 5.

Comparative Example 1

Laser light for lens tilt detection with a wavelength of 445 nm was applied to an optical pickup lens that was manufactured in the same manner as the example 1.

Comparative Example 2

Laser light for lens tilt detection with a wavelength of 445 nm was applied to an optical pickup lens that was manufactured in the same manner as the example 3.

Comparative Example 3

Laser light for lens tilt detection with a wavelength of 445 nm was applied to an optical pickup lens that was manufactured in the same manner as the example 6.

Comparative Example 4

Laser light for lens tilt detection with a wavelength of 680 nm was applied to a mirror-finished surface that was not covered with an antireflection coating in an optical pickup lens that was manufactured in the same manner as the example 1 except that the antireflection coating was not deposited outside of the lens effective diameter.

Comparative Example 5

Laser light for lens tilt detection with a wavelength of 680 nm was applied to a mirror-finished surface that was not covered with an antireflection coating in an optical pickup lens that was manufactured in the same manner as the example 3 except that the antireflection coating was not deposited outside of the lens effective diameter.

Figure 6:
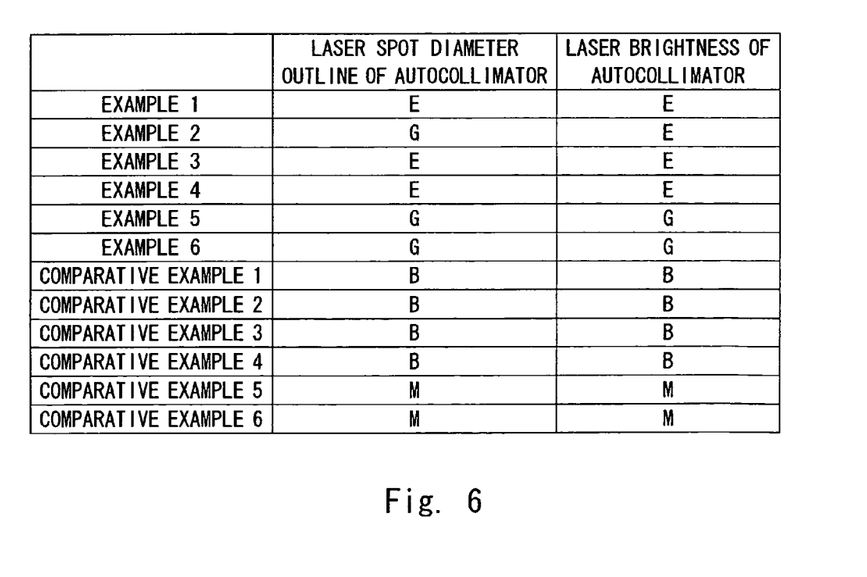
FIG. 6 is a table showing results of examples according to the present invention and comparative examples.

FIG. 6 is a table showing results of the examples 1 to 6 and the comparative examples 1 to 5. The items examined in this table are the shape of the laser spot diameter outline of the autocollimator and the laser brightness of the autocollimator. As for the shape of the laser spot diameter outline of the autocollimator, the amount of light collected in the brightest part at the center of the laser spot diameter of the autocollimator was observed, and the degree of diffusion of light in the vicinity of the brightest part was evaluated using the symbols E, G, M, B in ascending order (E is superior than G, G is superior than M, and M is superior than B). The laser brightness of the autocollimator was evaluated based on the brightness when the shape of the tilt adjustment laser spot diameter outline was most suitable using the symbols E, G, M, B in descending order (E is superior than G, G is superior than M, and M is superior than B). As shown in the table of FIG. 6, in the examples 1 to 6, the shape of the laser spot diameter outline and the laser brightness were both suitable.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical pickup lens comprising:
a first surface to focus laser light for recording/playback on an optical disc;
a second surface formed outside the first surface and radiated with laser light for lens tilt detection; and
an antireflection coating to transmit the laser light for recording/playback, the antireflection coating being continuously formed on the first surface and the second surface,
wherein when a radius of a surface that uniformly reflects the laser light for lens tilt detection is R and a radius of an outermost periphery of the antireflection coating is R+R1, a following expression is satisfied:

$R/(R+R1)*100<98$.

2. The optical pickup lens according to claim 1, wherein the second surface is a flange surface substantially perpendicular to a lens axis of the optical pickup lens.

3. The optical pickup lens according to claim 1, wherein the second surface is a surface facing toward a laser light source device to emit the laser light for lens tilt detection.

4. The optical pickup lens according to claim 1, wherein a wavelength λ2 of the laser light for lens tilt detection is different from a wavelength λ1 of the laser light for recording/playback.

5. The optical pickup lens according to claim 1, wherein the wavelength λ1 (nm) and the wavelength λ2 (nm) satisfy a following expression:

$λ2−λ1 \geq 20$ nm.

6. The optical pickup lens according to claim 1, wherein the second surface is mirror finished.

7. The optical pickup lens according to claim 1, wherein an antireflection coating is formed on a lens surface facing toward a laser light source device to emit the laser light for recording/playback and a surface outside the lens surface.

8. The optical pickup lens according to claim 1, wherein the antireflection coating has a layered structure, and a first layered structure of the antireflection coating on the first surface and a second layered structure of the antireflection coating on the second surface are different from each other.

9. The optical pickup lens according to claim 1, further comprising a lens body having light input and output surfaces being opposed to each other, the light output surface including the first surface and the second surface, and a surface that does not have the antireflection coating provided on the light input surface side and opposed to the second surface.

10. The optical pickup lens according to claim 1, further comprising a lens body having light input and output surfaces being opposed to each other, the light output surface including a lens surface as the first surface and a flange surface as the second surface, and a surface that does not have the antireflection coating provided on the light input surface side and opposed to the flange surface.

11. An optical pickup device comprising:
the optical pickup lens according to claim 1;
a laser light source device to emit laser light for lens tilt detection; and
a unit to detect the amount of a lens tilt by detecting the laser light emitted from the laser light source device and reflected on a part of the optical pickup lens.

12. An optical pickup lens comprising:
a first surface to focus laser light for recording/playback on an optical disc;
a second surface formed outside the first surface and radiated with laser light for lens tilt detection; and
an antireflection coating to transmit the laser light for recording/playback, the antireflection coating being continuously formed on the first surface and the second surface,
wherein
an antireflection coating is formed on a lens surface facing toward a laser light source device to emit the laser light for recording/playback and a surface outside the lens surface, and
the antireflection coating formed on the lens surface facing toward the laser light source device to emit the laser light for recording/playback and the surface outside the lens surface has a higher transmittance to the laser light for lens tilt detection than the antireflection coating formed on a lens surface facing toward the optical disc and a surface outside the lens surface.

13. An optical pickup lens comprising:
a lens body having light input and output surfaces being opposed to each other, the light output surface including a lens surface and a flange surface that is provided further out from an optical axis of the optical pickup lens than the lens surface;
a first coating layer extending continuously towards the optical axis and being provided on a boundary between the flange surface and the lens surface, the first coating layer being substantially transparent to a first laser light for recording/playback and being substantially reflective to a second laser light for lens tilt detection; and
a second coating layer formed on the light input surface;
wherein
a wavelength λ1 (nm) of the first laser light is different from a wavelength λ2 (nm) of the second laser light, and the wavelength λ1 (nm) and the wavelength λ2 (nm) satisfy a following expression:

$λ2−λ1 > 20$ nm, and the second coating layer has a higher transmittance to the second laser light than the first coating layer.

14. The optical pickup lens according to claim 13, wherein the flange surface is mirror finished.

15. The optical pickup lens according to claim 13, wherein the first coating layer covers at least 70% of an area of the flange surface.

16. The optical pickup lens according to claim 13, wherein the first coating layer has a layered structure, and a first layered structure of the antireflection coating on the lens surface and a second layered structure of the antireflection coating on the flange surface are different from each other.

17. An optical pickup device comprising:
the optical pickup lens according to claim 13;
a laser light source device to emit laser light for lens tilt detection; and
a unit to detect the amount of a lens tilt by detecting the laser light emitted from the laser light source device and reflected on a part of the optical pickup lens.

18. An optical pickup lens comprising:
a lens surface to focus laser light for recording/playback on an optical disc;
a mirror-finished surface that is formed outside the lens surface and reflects a laser light for lens tilt detection and that has a predetermined width; and
an antireflection coating to transmit the laser light for recording/playback,
wherein
the antireflection coating is continuously formed on the lens surface and the mirror-finished surface, and
an entire area of the mirror-finished surface is covered with the antireflection coating.

19. The optical pickup lens according to claim 18, wherein the antireflection coating continuously extends from the center of the lens surface across the area of the mirror-finished surface.

20. The optical pickup lens according to claim 18, wherein the lens surface and the mirror-finished surface are provided at a side opposite to where a laser light source device to emit the laser light for recording/playback is located.

21. The optical pickup lens according to claim 18, wherein the wavelength $\lambda 2$ (nm) of the laser light for lens tilt detection is different from the wavelength $\lambda 1$ (nm) of the laser light for recording/playback.

22. The optical pickup lens according to claim 21, wherein the wavelength $\lambda 1$ (nm) and the wavelength $\lambda 2$ (nm) satisfy the following expression:

$$\lambda 2 - \lambda 1 \geqq 20 \text{ nm}.$$

23. The optical pickup lens according to claim 18, wherein the antireflection coating has a layered structure, and a first layered structure of the antireflection coating on the lens surface and a second layered structure of the antireflection coating on the mirror-finished surface are different from each other.

24. The optical pickup lens according to claim 18, further comprising a lens body having light input and output surfaces being opposed to each other, the light output surface including the lens surface and the mirror-finished surface, and a surface having an area that does not have the antireflection coating provided on the light input surface side and opposed to the mirror-finished surface.

25. An optical pickup device comprising:
the optical pickup lens according to claim 18;
a laser light source device to emit laser light for lens tilt detection; and
a unit to detect the amount of a lens tilt by detecting the laser light emitted from the laser light source device and reflected on a part of the optical pickup lens.

* * * * *